United States Patent

[11] 3,597,673

| [72] | Inventors | Wilford B. Burkett<br>Pacific Palisades;<br>John H. Bigbee, III, Los Angeles, both of, Calif. |
|---|---|---|
| [21] | Appl. No | 836,791 |
| [22] | Filed | June 26, 1969 |
| [45] | Patented | Aug. 3, 1971 |
| [73] | Assignee | McCulloch Corporation<br>Los Angeles, Calif.<br>Continuation-in-part of application Ser. No. 744,902, July 15, 1968. |

[54] RAPID CHARGING OF BATTERIES
14 Claims, 7 Drawing Figs.

| [52] | U.S. Cl. | 320/5, 320/14, 320/20, 320/21, 320/22, 320/40 |
|---|---|---|
| [51] | Int. Cl. | H02j 7/10 |
| [50] | Field of Search | 320/5 CR, TD, 5, 14, 20—23, 30, 31, 34, 37—40, 53 |

[56] References Cited
UNITED STATES PATENTS

| 3,193,750 | 7/1965 | Chait | 320/22 |
| 3,278,823 | 10/1966 | Ross | 320/23 |
| 3,363,162 | 1/1968 | Bawden | 320/22 X |
| 3,465,230 | 9/1969 | Ball | 320/23 X |
| 3,517,295 | 6/1970 | Lapuyade | 320/39 X |
| 2,503,179 | 4/1950 | Tichenor | 320/14 |
| 3,226,623 | 12/1965 | Krueger et al. | 320/43 |
| 3,281,638 | 10/1966 | Crawford | 320/TD UX |
| 3,300,704 | 1/1967 | McMillen | 320/61 |
| 3,363,163 | 1/1968 | Nord et al. | 320/40 X |

Primary Examiner—J. D. Miller
Assistant Examiner—John M. Gunther
Attorney—Christie, Parker & Hale

ABSTRACT: A battery is charged in a very short period of time, for example less than 15 minutes, by applying a charging current that is in excess of the nominal 1-hour rate of the battery with discharge pulses sandwiched between charge pulses, with or without a rest period between the end of the charge pulse and the beginning of a discharge pulse and the end of the discharge pulse and the beginning of a charge pulse. The discharge pulse has a peak value in excess of the nominal 1-hour rate of the battery and the pulse has a short period, for example 1 to 4 microseconds, which time may be related to the time associated with the electrochemical characteristics and construction of the cell or cells of the battery being charged. The frequency of the discharge pulses is increased as the terminal voltage and charge of the battery increases. The charging at the high rate is terminated or converted to a trickle charge when the terminal voltage of the battery exceeds a selected voltage level associated with the desired level of charge in the battery. The disclosure relates to both the method of rapid charge and apparatus for rapid charging.

PATENTED AUG 3 1971 3,597,673

INVENTORS
WILFORD B. BURKETT
JOHN H. BIGBEE, III
BY
Christie, Parker & Hale
ATTORNEYS 3,597,673

1

RAPID CHARGING OF BATTERIES

CROSS-REFERENCES TO RELATED APPLICATIONS

This application is a continuation-in-part application of application Ser. No. 744,902, filed July 15, 1968, which is directed to an invention that is related to those disclosed and claimed in the copending U.S. applications Ser. No. 612,995, filed Jan. 31, 1967, and Ser. No. 726,060, filed May 2, 1968, and assigned to the same assignee as this application. The invention of this continuation-in-part application constitutes an improvement in the step of terminating the rapid charging disclosed in these applications, and an improvement in the rapid charging method and apparatus of both applications, in simplification of circuitry and reduction in cost.

BACKGROUND OF THE INVENTION

Field of the Invention

This invention relates to a method and apparatus for charging batteries and is particularly adapted to the charging of batteries in a minimum amount of time and with a nondestructive battery temperature rise.

The charging of batteries to substantially rated capacity in less than an hour had apparently not been accomplished prior to the discovery and method of charging batteries disclosed in the above-identified applications. By the methods and means for rapid-charging batteries of these applications, batteries comprised of one or more cells can be charged to at least the rated capacity in less than 20 minutes.

SUMMARY OF THE INVENTION

It has now been found that batteries can be charged to the rated capacity in less than 15 minutes without a significant increase in battery temperature by employing the method and means of the present invention. Additionally, the high current required for rapid charging may be either terminated or converted to a low level for trickle charging by a simple circuit that monitors the terminal voltage of the battery.

Thus, in accordance with the present invention, batteries comprised of one or more cells are charged in a very short period of time, for example, less than 15 minutes, with minimal temperature rise of the cells, by employing the method that comprises the steps of transmitting direct current pulses to a battery through a continuously operable electrical connection generating a first control signal in response to a function of said battery, generating a second control signal in response to the termination of a direct current pulse supplied to the battery, the second control signal cooperating with the first control signal to provide a composite control signal operable to electrically apply a discharge path across the battery during an increment between the transmission of adjacent direct current pulses to the battery and limiting the time of applying the discharge path to the battery to an increment less than the increment between adjacent direct current pulses. The period of the discharge current pulse may advantageously be related to a time associated with the electrochemical characteristics and construction of the cell or cells of the battery being charged.

The method includes the additional step of terminating the charge or reducing the current to a trickle charge upon the attainment of a predetermined battery terminal voltage during the time that charge current is not flowing, which terminal voltage is related to the charge condition of the battery.

Further, in accordance with the present invention, batteries are charged in a short period of time with minimal temperature rise by a charging circuit comprising transmission means operable to transmit direct current pulses to a battery being charged through a continuously operable electrical connection. A discharge path and discharge means for periodically electrically applying the discharge path across said battery without interrupting said electrical connection between said battery and said transmission means, said discharge means including first signal generating means operable in response to a battery function and second signal-generating means operable in response to the termination of direct current pulses supplied to said battery, said second signal generating means cooperating with said first signal generating means to provide a control signal operable to apply said discharge path across said battery during an increment during the transmission of adjacent direct current pulses to said battery.

The circuit may further include means operable in response to the attainment of a predetermined battery terminal voltage during the absence of direct current pulses to reduce the current applied to said battery, and means for making the reducing means substantially insensitive to temperature variations. Additionally, the circuit may further include means for selectively disabling the reducing means.

In one specific embodiment, the first signal generating means includes a capacitor means for integrating a current related to battery terminal voltage with respect to time, and the second signal generating means is operable to generate a current transient additive in polarity to a charge on said capacitor means, said discharge means being operable to apply said discharge path across said battery in response to a total charge on said capacitor means in response to a predetermined charge on said capacitor means in addition to the portion of the current transient.

Further, the second signal-generating means in one embodiment includes inductance means in series with said capacitance means and a voltage divider means with said current transient being generated in said inductance means in response to the termination of a current pulse applied to said battery.

The discharge path in one specific embodiment comprises two cascade-connected transistors with one being connected directly across said battery and the other being connected to the first signal generating means.

BRIEF DESCRIPTION OF THE DRAWINGS

The above and other features and advantages of the present invention may be understood more clearly and fully upon consideration of the following specification and drawings, in which.

DESCRIPTION OF THE PREFERRED EMBODIMENT

Figure 1:
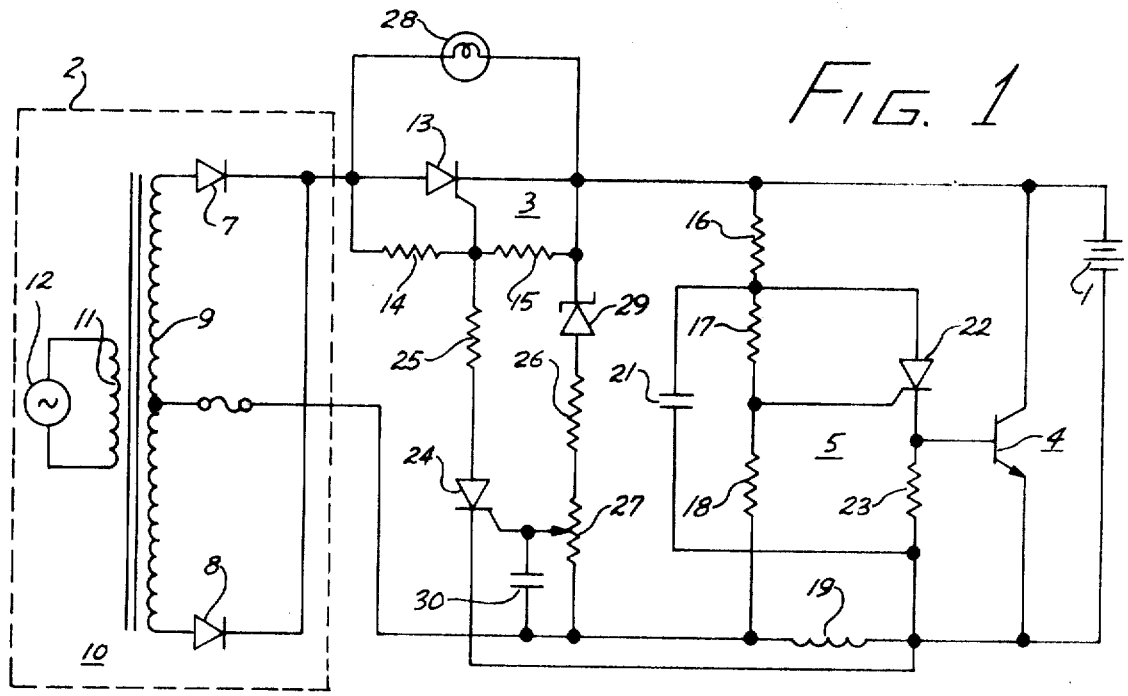
FIG. 1 is a schematic diagram of a circuit for charging a battery in a short time with minimal battery temperature rise in accordance with the present invention.

In the majority of the applications where batteries or other rechargeable electrochemical power sources are employed as a power source, it is desirable to charge the power source in the shortest possible time. A schematic diagram of a preferred embodiment of a circuit for charging such power sources, and, in particular, batteries that have one or more cells, in a very short period of time, for example, in less than 15 minutes, with very little increase in battery temperature, is shown in FIG. 1.

The circuit for charging a battery 1 includes a source 2 of direct current pulses, a first controllable switch 3, connected between the source 2 and the battery 1, and a second controllable switch 4 connected across the battery 1. The apparatus further includes a means 5 responsive to a selected voltage at the terminals of the battery for controlling the operation of the switch 4 for selectively discharging the battery 1 between charging pulses.

For purposes of illustration it will be assumed that the battery to be charged is comprised of 10 sub C sealed nickel cadmium cells. However, it is to be understood that this invention is not limited to charging sealed nickel cadmium cells nor batteries of exactly 10 cells. It is applicable to the charging of one or more cells. It is also applicable to the charging of any rechargeable electrochemical power source.

For the illustrative example, it is assumed that a sub C nickel cadmium cell is the one used in battery 41 B001KD06 manufactured by the General Electric Company, which has a nominal voltage of 1.2 volts per cell and a nominal capacity of one ampere-hour when discharged at a rate of 100 milliamperes over a 10-hour period to a selected end voltage. The manufacturer recommends that this cell be charged at 100 milliamperes for a period of 16 hours. This time is excessive as this cell can be charged in considerably less time with negligible increase in temperature by employing the method of the present invention.

For the purposes of this application, C will be the amperage of the current at which a cell has been discharged in rating the cell to a selected end voltage in a selected period of time, which is generally 1 hour or 10 hours. For example, the above cell has a C rate of 1 ampere whereby a selected end voltage is reached in 1 hour.

The method of the present invention can be advantageously employed to charge the cell to at least its nominal rated capacity in less than 15 minutes, and has been used to charge such a cell to its nominal rated capacity in approximately 6 minutes.

Figure 2:
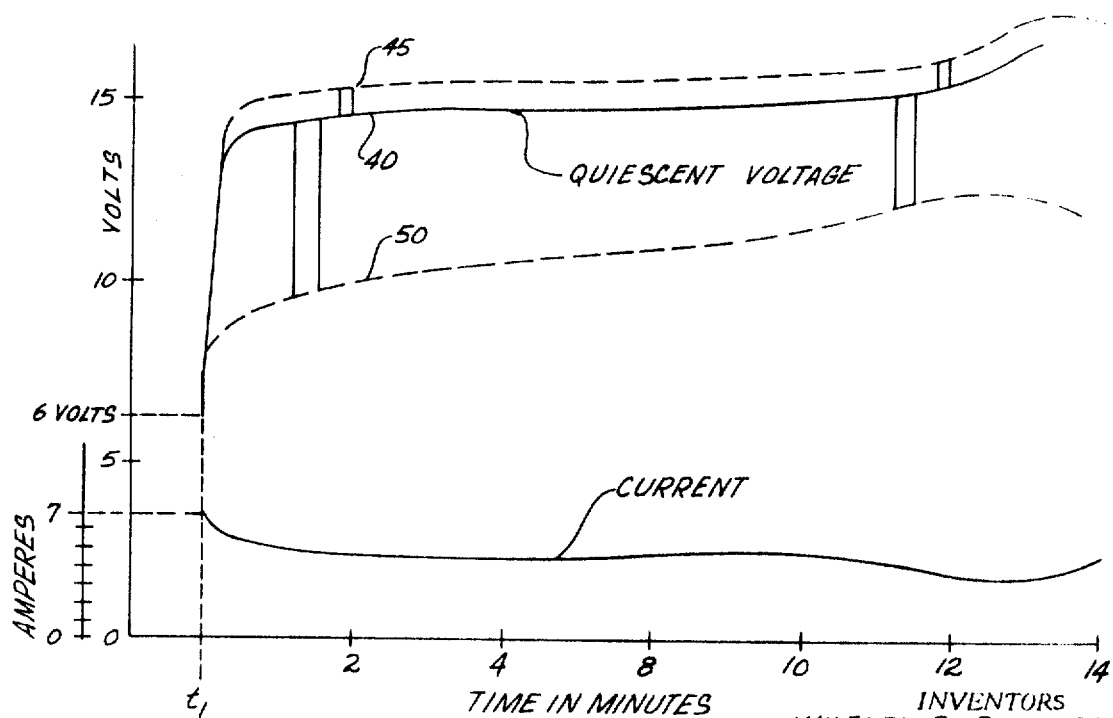
FIG. 2 is a graph showing the variations in battery terminal voltage and average charging current in the circuit of FIG. 1 in accordance with the present invention.

The voltage at the terminals of a battery comprised of 10 sub C cells and the charging current applied to the battery in accordance with the method of the present invention are representatively shown in the chart of FIG. 2. For purposes of illustration, it is assumed that the battery to be charged was initially discharged to an end voltage of approximately 6 volts, and it is assumed that this is the terminal voltage of the battery at the time charge is initiated. The time of initiation of charge is representatively shown as time $t_1$ on the chart of FIG. 2. At time $t_1$ a charging current, that is in excess of the nominal 1-hour rate of the battery, in this case approximately seven times C, is applied to the battery. Upon application of the charging current the terminal voltage of the battery, represented by curve 40, rises very rapidly from 6 volts to approximately 14 volts. Thereafter, the terminal voltage tends to level off at about 15 volts and remains at this voltage upon the continued application of charging current pulses. As the battery terminal voltage rises rapidly to the 14-volt point there is a corresponding decrease in the charging current to an average value of approximately 5 amperes.

Figure 3:
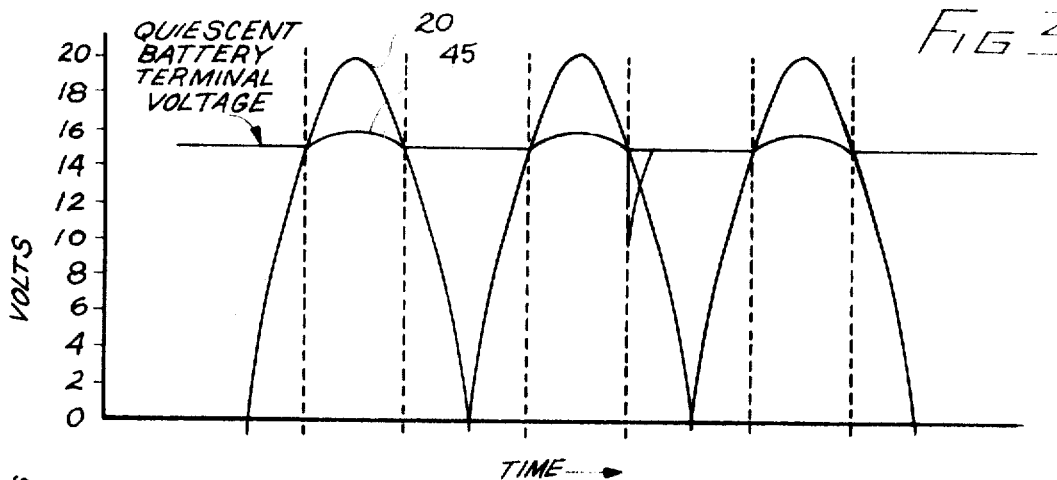
FIG. 3 is a graph showing the relationship of the pulsating direct current voltage and the battery terminal voltage.
Figure 4:
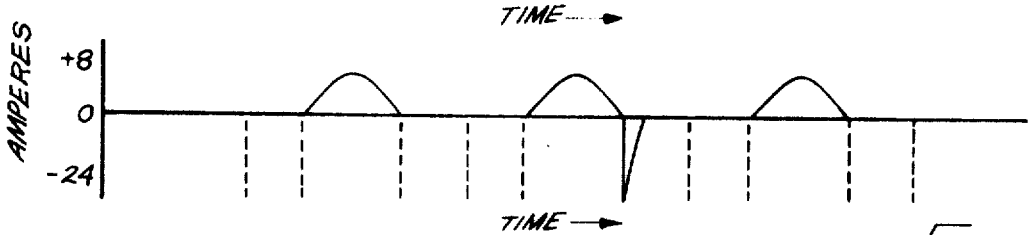
FIG. 4 is a graph showing the relationship of the charging current and the discharging current to the pulsating direct current voltage shown on the graph of FIG. 3.
Figure 5:
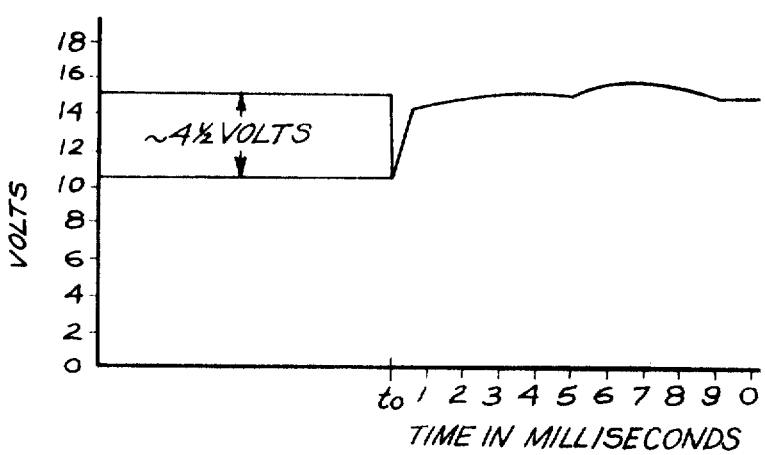
FIG. 5 is a graph having an expanded time base showing the variation in battery terminal voltage during a discharge current pulse.

The charging current is applied as pulses to the battery, which pulses may be produced by employing the pulsating direct current voltage that appears at the output of a rectifier connected to an alternating current voltage source. The resultant correspondence between charging current pulses and the pulsating direct current voltage is shown in the charts of FIGS. 3 and 4, which charts have the same time base. Charging current will flow into the battery when the pulsating direct current voltage from the source rises above the terminal voltage of the battery, which terminal voltage is shown to be approximately 15 volts in the chart of FIG. 3.

For purposes of illustration, it is assumed that the pulsating direct current voltage from the source without a load, has a peak value of approximately 20 volts, as representatively shown by curve 20 in FIG. 3, so that charging current flows during approximately one-half of each pulse of direct current voltage from the source. Thus, if the voltage is supplied through a stepdown transformer connected to a standard 110-volt, 60-cycles per second or 60 Hertz line, the charging current will flow for approximately 4 milliseconds of the 8.3 millisecond direct current voltage pulse duration.

While the discharge current in the copending application Ser. No. 726,060, filed May 2, 1968, was applied for a period of time longer than the time period of an input pulse from the voltage source, it has been found that a discharge pulse having a shorter time period has certain advantages. In particular, it has been found that the battery remains cooler during the charging cycle and that the battery may be substantially fully charged in less time. Also, it has been found, in particular, that batteries comprised of 10 sub C cells and having a nominal capacity of 1 amp-hour or 3,600 ampere seconds, can be fully charged to the level of 3,600 ampere seconds in less than 8 minutes.

Figure 6:
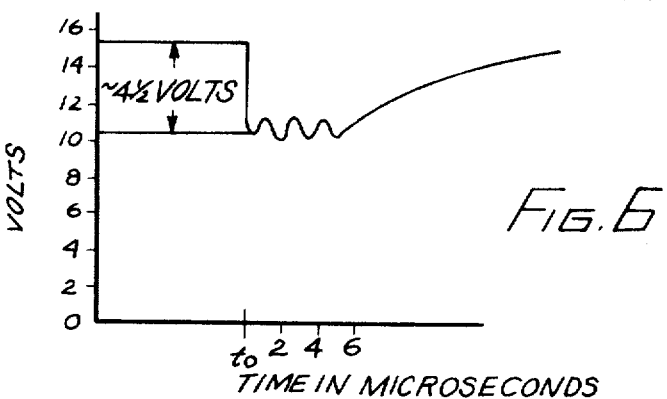
FIG. 6 is a graph showing the variation in battery terminal voltage during a discharge current pulse relative to an expanded time base.

In the case of the battery comprised of 10 sub C cells, it has been found that the battery terminal voltage during the discharge pulse had a variation such that there was a high-frequency variation in voltage superimposed on the battery terminal voltage variation. This high-frequency variation is shown in FIG. 6 which is a drawing on an expanded time scale, representing the waveform of the battery terminal voltage during discharge. The frequency of the superimposed voltage was found to be approximately four-tenths of a megacycle or 4/10 $MH_3$. The cause of this high-frequency component is not known but it has been hypothesized that there may be some sort of resonance in the battery. To take advantage of this high-frequency component and possible resonance, the duration of the discharge pulse was selected to be approximately 2 microseconds which is the period of the 4/10-megacycle component.

By employing a discharge pulse having a duration of two microseconds it was found that the battery remained relatively cool. For example, over the entire charging cycle, the battery temperature generally increases somewhere between 5° F. and 15° F. Additionally, it was found that the average value of the discharge pulse could be substantially less than the average value of the discharge pulse employed in the methods of the above-mentioned applications.

With a discharge pulse duration of only 2 microseconds the charging current does not have to be interrupted since the discharge pulse can fit between charging current pulses. This is shown in the chart of FIG. 4 of the drawings. The discharge pulse is shown on FIG. 4 as occurring immediately after a charge pulse. However, there may be a rest period before the discharge pulse is applied, and the pulse may occur toward the end of the period between charge pulses so that there is little rest period before the next charge pulse.

A battery charger for quick-charging batteries of one or more cells in accordance with the present invention is shown in schematic form in FIG. 1. As stated above, battery 1, to be charged, is connected to a source 2 through a controllable switch 3. The source 2, which provides a pulsating direct current voltage for charging battery 1, may be any source that will provide a charging current to the battery being charged. Source 2 in this illustrative example includes a full-wave rectifier comprised of diodes 7 and 8 connected to the opposite ends of the secondary winding 9 of a transformer 10. The primary winding 11 of the transformer 10 is connected to an alternating current source 12. The alternating current source 12 may advantageously be the 60-Hertz alternating current available from a wall plug. With a 60-Hertz input and full-wave rectification the voltage waveform appearing at the output of the source 2 will have the form shown in FIG. 3 with a repetition rate of approximately 8.3 milliseconds.

The pulsating direct current voltage is applied to the battery 1 through the controllable switch 3 which includes a silicon controlled rectifier 13, with a resistor 14 connected between the anode and gate of the rectifier 13, and a resistor 15 connected between the gate and cathode of the rectifier 13. When the output voltage from the source 2 exceeds the terminal voltage of battery 1 the silicon controlled rectifier 13 will be forward-biased, and current will begin to flow through resistors 14 and 15 and through the gate-cathode junction of the silicon controlled rectifier 13 to turn rectifier 13 "on." Charging current will then flow into the battery 1 through rectifier 13 and will continue to flow as long as the output of the source 2 exceeds the terminal voltage of the battery 1. The circuit between the source 1 and the battery 2 forms a continuously operable connection.

In the illustrative example, the voltage appearing across one-half of the center-tapped secondary 9 of the transformer 10 has a peak value of 20 volts. However, the voltage applied to the battery 1 does not increase to the 20-volt peak value but is held down by the battery 1, which acts like a capacitor across the secondary of the transformer, and by the impedance of the source through which the load current flows. The unloaded voltage across the secondary of the transformer, with a peak value of 20 volts, is shown as voltage curve 20 in FIG. 3. The voltage across the secondary, with a battery for a load, is shown as voltage curve 45 in FIG. 3. When the battery terminal voltage is approximately 15 volts, it has been observed that the voltage drop across the battery due to the resistance of the battery is approximately 0.8 volts so that the voltage rises approximately eight-tenths of a volt above the quiescent battery terminal voltage, i.e., above the battery terminal voltage when no charge current or discharge current is flowing. The voltage rise will depend upon the condition of the battery, with a greater rise occurring when the battery being charged has a higher internal impedance, with the internal impedance generally being an indication of the condition of the battery and with higher internal impedances being associated with relatively poorer batteries.

When the charging current begins to flow into the battery 1, the terminal voltage rapidly rises from the value obtained immediately after discharge which, in the illustrative example, is assumed to be 6 volts. The terminal voltage of the battery will rapidly rise to approximately 14 volts and then level off at around 15 volts.

In accordance with the present invention the battery is discharged intermittently, which enhances the chargeability of the battery. Also, by applying the short discharge pulses sandwiched between the charge pulses, it has been found that the battery temperature changes very little, e.g., 5° to 15° F. The battery is discharged through the discharge path provided by controllable switch 4, which may advantageously be a power transistor having its emitter-collector path connected across the battery, with the operation of the power transistor being controlled by the voltage-sensing circuit 5. The control circuit 5 acts similar to a relaxation oscillator and is responsive to the appearance of a selected voltage level across the terminals of the battery 1. The control circuit 5 could be made responsive to some other condition of the battery, such as, for example, the temperature of the battery or the internal pressure of the battery. Control circuit 5 includes a voltage divider comprised of resistors 16, 17, and 18 connected in series across the series connection of battery 1 and an inductor 19. The control circuit further comprises a timing capacitor 21 and a silicon controlled rectifier 22, with a current-limiting resistor 23 connected in the anode-cathode current path of the silicon-controlled rectifier 22.

The appearance of the first discharge pulse by the closing of switch 4, which in this illustrative example, is a power transistor, and subsequent discharge pulses are determined primarily by the RC time constant of the control circuit 5, which is determined by the capacitance of capacitor 21 and the resistance of resistor 16 and inductor 19. As the charge on capacitor 21 increases, the voltage on the gate terminal of silicon controlled rectifier 22 between resistors 17 and 18 also increases. When the voltage on the gate with respect to the cathode of silicon controlled rectifier 22 is of sufficient magnitude to gate "on" or fire the silicon controlled rectifier 22, current will flow from both the positive terminal of the battery 1 and from the capacitor 21 through the anode-cathode path of rectifier 22 to the base emitter junction of transistor 4, thereby turning on transistor 4. The biasing "on" of transistor 4 provides the discharge path across the battery 1. When silicon controlled rectifier 22 does fire, the capacitor 21 discharges and provides a large base current to power transistor 4 through rectifier 22 to substantially saturate the transistor 4 to provide a low-resistance discharge path across the battery. Thereafter, the combination of the base-drive impedance of transistor 4 in parallel with resistor 23 and the capacitance of capacitor 21 determines the duration of the discharge pulse by determining the length of time transistor 4 is forward biased. For the illustrative example, the pulse duration was set at approximately 2 microseconds.

The repetition rate of the discharge pulses established by the time constant of control circuit 5 is approximately one per second in the early stages of charging and increases as the battery charges. This repetition rate is not discernible on the curves of FIG. 2 because of the time base for the curves of FIG. 2. However, the application of discharge pulses with a resultant decrease in terminal voltage is representatively shown on the voltage curve 40 of FIG. 2. The terminal voltage of the battery decreases in the case of a relatively good 10-cell battery approximately 5 volts during the early stages of charging and approximately 4 volts toward the end of charge as representatively shown by the dotted line 50 in FIG. 2.

The gating "on" of transistor 4 must be properly timed so that the application of the discharge path does not occur while the silicon-controlled rectifier 13 is in its "on" condition and charging current is being applied to the battery, because this would effectively place a short across the secondary of the transformer 10, which could easily damage the transformer. Thus, in this case, an inductor 19, is placed in the conduction path between the source 2 and the battery 1 and also between the gate and cathode of silicon controlled rectifier 22 to cause the firing of silicon controlled rectifier 22 between charging current pulses.

As the output voltage across the secondary 9 of transformer 10 decreases and approaches the battery terminal voltage, the conducting diode 7 or 8 will shut off. This is an abrupt shutoff which occurs while the inductor 19 is trying to conduct current. As a consequence a spike is generated across the inductor each time one of the diodes 7 or 8 and silicon-controlled rectifier 13 shut off. As the voltage between the gate and cathode of silicon-controlled rectifier 22 approaches the threshold a spike generated across the inductor 19 will be sufficient to turn the silicon-controlled rectifier 22 "on." The capacitor 21 charges on an exponential curve toward the battery terminal voltage. As noted above, this voltage varies between the quiescent voltage when no charge current is flowing and the higher voltage when charge current is flowing. To avoid the reaching of the threshold voltage for the firing of silicon-controlled rectifier 22 during the application of charge current, the inductor 19 is designed to have a resistance that is equal to or greater than the internal impedance of the battery being charged. By connecting the gate and cathode of silicon-controlled rectifier 22 to opposite ends of the inductor 19, the voltage drop across the inductor 19 subtracts from the battery terminal voltage and the voltage between the gate and cathode is then equal to or less than the voltage when no charge current is flowing. The gate sees the difference between a portion of the voltage on capacitor 21 and the drop across the inductor 19 so that the silicon controlled rectifier cannot turn on while charge current is flowing. While no charge current is flowing the gate sees a portion of the voltage on capacitor 21 and a portion of the voltage spike when it is generated by inductor 19. In this way, the discharge pulse will occur almost immediately after charging current ceases to flow. However, if it is desired to delay the appearance of the discharge current pulse after the termination of the charge pulse, i.e., have a rest period between the charge pulse and the discharge pulse, the turning on of silicon controlled rectifier 22 and power transistor 4 may be delayed. In any event, the discharge pulse has a selected time duration which is less than the time interval between charging current pulses so that charging current is not interrupted but is permitted to flow each time the voltage from source 2 exceeds the battery terminal voltage. The discharge pulses occur approximately once every second with the repetition rate increasing as the charge progresses and the battery terminal voltage increases. This repetition rate may be varied by changing the time constants in the control circuit 5.

If it is desired to charge the battery in a relatively shorter period of time than the 14 minutes shown in FIG. 2, the charging current may be increased. This will, of course, result in the terminal voltage of the battery increasing more rapidly so that the discharge pulses will occur more frequently. Batteries comprised of 10 type sub C sealed nickel cadmium cells have been charged to the rated capacity of the battery in less than eight minutes by employing the method and apparatus of the present invention.

It is desirable to terminate the charge when the battery has been charged to its rated or nominal capacity or its full-charge condition. It has been found that when the battery approaches the full-charge condition there is a very rapid rise in the battery terminal voltage. This rapid rise is a very reliable indicator of the full-charge condition of the battery while the temperature of the battery is not generally a good indicator because it does not increase excessively during the charging process when the present invention is employed.

In batteries comprised of 10 type sub C cells, by employing the present invention, there is a rapid voltage rise from approximately 15.8 volts to 17 volts in approximately 1 minute, which time of rise depends primarily upon the magnitude of charging current. Thus, for the 10-cell battery of the illustrative example, a battery terminal voltage of approximately 16.3 volts was selected for indicating the time at which charging at high charge rates should be terminated. This voltage was selected to avoid the effects of excessive heating which may take place above 17 volts for this type of cell. To effect such termination, a voltage-responsive switch 24, comprising a silicon controlled rectifier, is connected through a current-limiting resistor 25 to the gate of silicon-controlled rectifier 13. The gate of silicon-controlled rectifier 24 is connected to a voltage divider comprised of a Zener diode 29 and resistors 26 and 27 connected in series across the series connection of inductor 19 and battery 1. The cathode of rectifier 24 is connected to the negative terminal of the battery 1 at the junction of inductor 19 and battery 1. By this connection and by providing a sufficient value of resistance in the charging current path, which resistance in the illustrative example of FIG. 1 is provided by the resistance of inductor 19, the charge termination circuit, including rectifier 24, will be triggered "on" only during the intervals that charge current is not flowing so that the circuit is responsive to the quiescent voltage which is an effective indicator of charge condition. When the rapid rise of quiescent terminal voltage occurs as the battery approaches its fully charged condition and the predetermined terminal voltage is attained, silicon-controlled rectifier 24 is gated "on" to effectively bypass the gate current for silicon-controlled rectifier 13. This prevents the rectifier 13 from again turning "on" as long as rectifier 24 is conducting so that the rapid charging is terminated.

It has been found that it is advantageous to make the impedance of inductor 19 equal to the internal impedance of a good battery. In this way the circuit has a built-in fail-safe feature. A poor battery that has a higher internal impedance will tend to heat up more during charge. If the same voltage is selected for the triggering of the shutoff silicon-controlled rectifier 24, a poor battery may heat excessively before this voltage is reached. However, because of the higher internal impedance, the battery terminal voltage will exceed the voltage drop across inductor 19 and the shutoff silicon-controlled rectifier will be responsive to this higher voltage. The rectifier 24 will be turned on sooner to terminate the charge before the battery is damaged.

However, it may be desirable to apply a trickle charge after the completion of the rapid charge cycle. To this end a relatively high resistance path is connected across switch 13 so that when switch 13 no longer conducts, a reduced current will flow into the battery. Furthermore, the relatively high resistance path may include, separately, or in combination with other elements, a lamp 28 that will glow more brightly when most of the current flows through this path instead of through rectifier 13 to provide a visual indication of the end of the rapid charge cycle.

A small amount of current, in the case of the illustrative example the current was approximately 140 milliamperes, flows through the parallel combination of lamp 28 and series resistors 14 and 15. Of this 140 milliamperes, approximately 100 milliamperes flow through the battery to trickle charge the battery. The remaining current is divided between the two voltage dividers of Zener diode 29 and series resistors 26 and 27 and series resistors 16, 17, and 18. The current through the gate-cathode leakage resistance of SCR 13, resistor 15 and resistor 25 act as holding current for silicon-controlled rectifier 24 to continue the trickle charge for as long as is desired.

The circuit of FIG. 1 has a degree of inherent temperature compensation to avoid premature shutoff when the circuit components heat up. Ordinarily, the shutoff silicon-controlled rectifier 24 will fire with a smaller gate current as its temperature increases because its gate sensitivity increases. As a result, the shutoff circuit may operate prematurely before the battery has attained the desired state of charge. However, the Zener diode 29 has a positive temperature coefficient so that the voltage drop across the diode increases as its temperature increases. This increased drop decreases the voltage applied to the rectifier 24 and compensates for the increased gate sensitivity.

The increased sensitivity of the shutoff silicon-controlled rectifier 24 with increased temperature may also be advantageously used to protect the battery from excessive temperatures caused by overcharging. The rectifier 24 may be located in thermal contact with the battery being charged so that any excessive increase in temperature will be sensed and will cause the shutoff silicon-controlled rectifier 24 to shut off sooner. A capacitor 30 is connected across the gate-cathode junction of transistor 24 to bypass line voltage transients.

Figure 7:
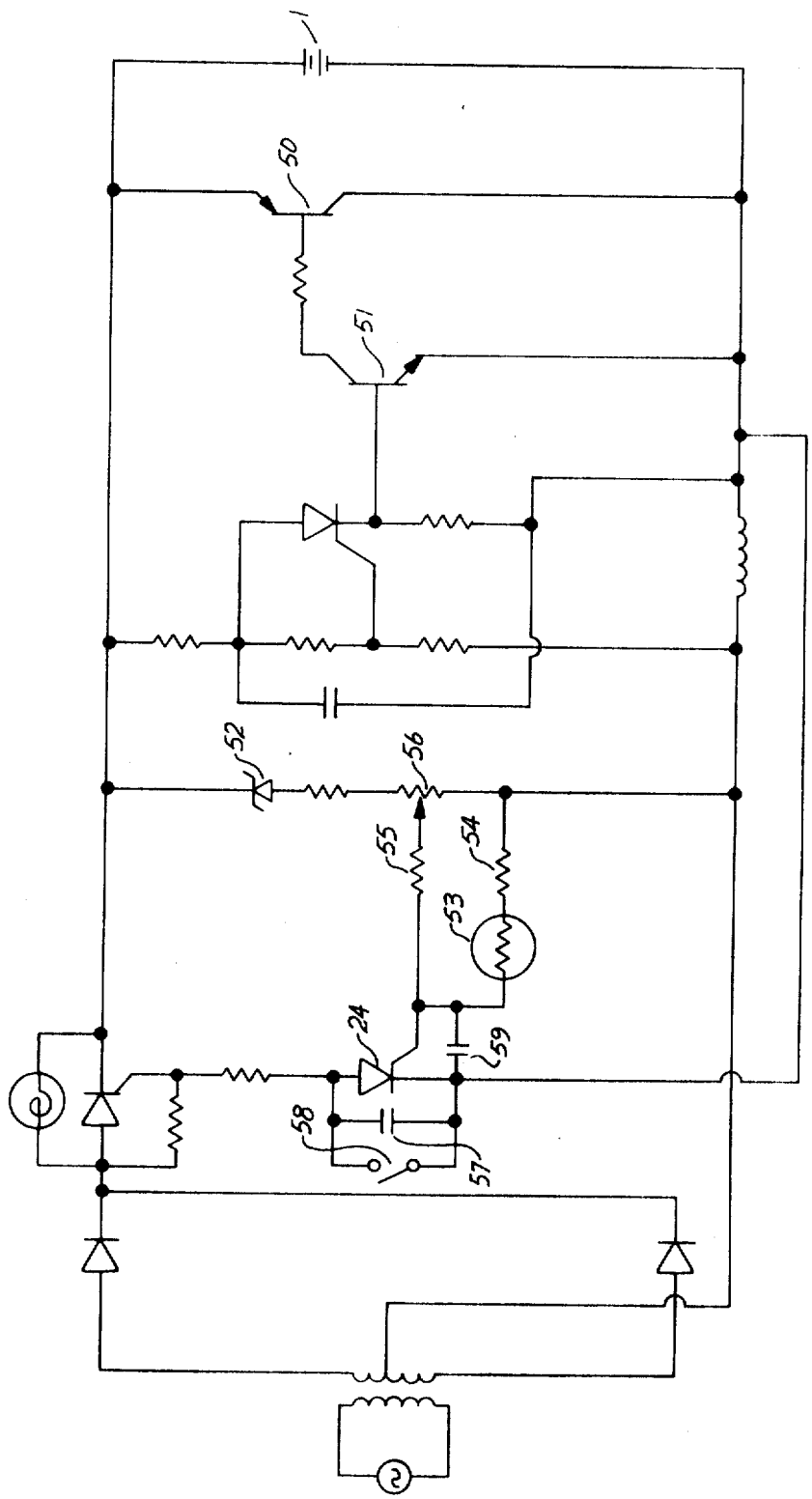
FIG. 7 is a schematic diagram of an alternative circuit for charging a battery in a short time with minimal rise in battery temperature in accordance with the present invention.

An alternative charging circuit is shown in schematic form in FIG. 7, and has certain advantages over the circuit shown in FIG. 1. Components that are the same in the two circuits have the same reference numbers.

In describing the operation of the circuit of FIG. 1 it was assumed that a 10-cell battery was being charged. For charging a battery having a different number of cells the Zener diode in the shutoff circuit will have a different rating than would the Zener diode 29 in FIG. 1 for a 10-cell battery. Similarly, the resistance of the inductor 19 will be different to compensate for the different internal impedances that are experienced with different batteries. To extend the usefulness of the circuit of FIG. 1 for the charging of many batteries, a plurality of Zener diodes may be added to the circuit and the diode with the proper rating connected in the circuit by a multipole switch positioned either at the top of resistor 26 or at the cathode of silicon-controlled rectifier 13. Additionally, the resistance of inductor 19 may be varied to provide the proper resistance in view of the internal impedance of the particular battery under charge.

In the circuit of FIG. 7 a pair of transistors 50 and 51 are connected in cascade across the battery 1. The cascade-connected transistors of FIG. 7 are an improvement over the single transistor 4 of FIG. 1 in that PNP transistor 50 is driven into saturation quickly to provide a deeper discharge pulse from the battery 1. Additionally, there is amplification of the base drive current for transistor 50 through transistor 51 so that the transistor 50 goes quickly into saturation and conducts throughout its entire junction area rather than through localized regions in which excessive current might damage the device.

In the circuit of FIG. 7 a peak discharge current between 150—200 amperes for a duration of approximately 1 microsecond has been found to be appropriate when charging a four1cell battery. These discharge pulses occur at about eight times per second during the initial stages of charging and increase to about 11 times per second as the battery nears the full-charge condition.

When charging a four-cell battery the nominal quiescent terminal voltage is between 6 and 6.2 volts when the method and charging circuit of the present invention is employed. Thus, assuming that the circuit of FIG. 7 is employed for the charging of a four-cell battery, the rated voltage for the Zener diode 52 will be approximately 5 volts. It has been found, however, that 5-volt Zener diodes have a temperature coefficient of substantially zero so that the temperature compensation that appears in the circuit of FIG. 1 when charging a 10-cell battery, is not present when charging a four-cell battery. To provide the desirable temperature compensation a series connection of a thermistor 53 and a small resistor 54 is connected in the gate circuit of the shutoff silicon-controlled rectifier 24. As the temperature of the components in the circuit increase, and in particular the temperature of silicon-controlled rectifier 24, its gate sensitivity increases so that it may conduct prematurely. With the connection of the thermistor 53 as shown in FIG. 7 an increase in temperature in the circuit components will cause a decrease in the resistance of the thermistor 53 so that a smaller signal will be applied to the gate of silicon controlled rectifier 24 to compensate for the increased sensitivity and assure shutoff at the proper time.

Additionally, it is desirable that any transients that may be created when the circuit is energized or when the battery is connected for charging, not turn on silicon-controlled rectifier 24 to inhibit the application of the desired high charging current. Thus, a switch 58 is connected between the anode and cathode of the silicon-controlled rectifier 24. This switch may be momentarily closed, after the battery has been connected and after the circuit has been energized, to bypass all transients and inhibit conduction through silicon controlled rectifier 24. Thereafter, the switch 58 may be opened and rapid charging commenced, with capacitors 57 and 59 bypassing line voltage transients.

Various changes may be made in the details of construction without departing from the spirit and scope of the invention as defined by the appended claims.

What we claim is:

1. A circuit for rapid charging a battery having one or more cells, an inductor, a first controllable switch, a source of pulsating direct current voltage connected to the battery through said switch on one side and through said inductor on the other side for providing charging current pulses, a second controllable switch connected across said battery, means responsive to the voltage across said battery and said inductor for closing said second switch, means for holding said second switch closed for a period of time less than the interval between charging pulses, and means responsive to a selected level of voltage across the battery between charging pulses for inhibiting said first switch to terminate the application of charge current through said switch.

2. Apparatus for rapidly charging a battery from a source of charge current pulses, said apparatus comprising a first controllable switch connected between the source and the battery; a second controllable switch connected across the battery; means for sensing the terminal voltage of the battery; means for sensing the flow of charge current through the battery; means responsive to both sensing means for controlling the operation of said second controllable switch for discharging the battery; and means for inhibiting said first controllable switch in response to the attainment of a selected quiescent battery terminal voltage during charge to terminate charge.

3. Apparatus for rapidly charging a battery from a source of charge current pulses, said apparatus comprising a first controllable switch connected between the source and the battery; a second controllable switch connected across the battery; means for sensing the terminal voltage of the battery; means for sensing the flow of charge current through the battery; means responsive to both sensing means for controlling the operation of said second controllable switch for discharging the battery; an electrical path connected in parallel with said first controllable switch for providing trickle charge current to said battery, and means to inhibit the operation of said first controllable switch in response to the attainment of a selected quiescent battery terminal voltage during charge to convert from a rapid charge to a trickle charge.

4. A circuit for terminating the high-rate charging of a battery having one or more cells comprising a first electrical path having a first resistance, a second electrical path having a second resistance greater than said first resistance connected in parallel with said first path, a source of charging current connected to the battery through said first and second paths, circuit means electrically connected for monitoring the quiescent terminal voltage of one or more of the cells of said battery, and circuit means responsive to said monitoring means for substantially increasing the resistance in said first path to cause the charge current to flow through said second path at a reduced rate to said battery upon the attainment of a predetermined quiescent battery terminal voltage.

5. A method of terminating the rapid charging of a battery having one or more cells comprising the steps of rapid charging a battery by charging the battery during a plurality of charging intervals, providing discharge intervals interspersed with said charging intervals, and causing the duration of intervals of said charging to diminish as said charge in said battery increases; monitoring the quiescent terminal voltage of one or more of the cells of said battery during the rapid-charging step; and terminating the rapid-charging step when the monitored quiescent terminal voltage assumes a predetermined value.

6. A method of battery charging comprising the steps of rapid charging a battery by applying a charging current at a rate in excess of the nominal 1-hour rate of the cells of the battery; monitoring one of the parameters of terminal voltage, pressure, and temperature of the battery which change as charge progresses; and intermittently discharging the battery in response to the attainment of a predetermined value of the monitored parameter; monitoring the quiescent terminal voltage of one or more of the cells of the battery during the rapid-charging step; and terminating the rapid-charging step when the quiescent terminal voltage assumes a predetermined value.

7. A method of rapid charging batteries having one or more cells comprising the steps of applying charging current pulses having an average value in excess of the nominal 1-hour rate of the cells and discharging the battery for a period of time less than the duration of a charging current pulse with the discharge current having a peak value between 100 and 200 times the nominal 1-hour rate of the cells.

8. A method of rapid charging batteries having one or more cells comprising the steps of applying charging current pulses having an average value in excess of the nominal 1-hour rate of the cells, and discharging the battery for a period of time less than the duration of a charging current pulse with the discharging period being approximately 2 microseconds in duration.

9. A rapid battery charging circuit comprising source means for supplying direct current pulses to a battery when the voltage level of said pulses exceeds the terminal voltage of said battery, a charge current path connected between said source and said battery, a discharge path of a first power transistor controlled by a second transistor, circuit means for sensing the quiescent terminal voltage of the battery, and circuit means connecting said second transistor to the sensing means for applying the discharge path across said battery each time the quiescent terminal voltage attains a predetermined value.

10. The battery-charging circuit of claim 9 further including circuit means responsive to the attainment of a predetermined value of quiescent terminal voltage for preventing charge current flow through said charge current path to terminate the charging of said battery.

11. A method of charging batteries having one or more cells comprising the steps of applying a charging current to the battery whereby the parameters of terminal voltage, temperature, and pressure of the battery change; sensing the change in one of the parameters; intermittently, in response to the attainment of a preselected value of the sensed parameter, depolarizing the battery by reversing the current through the battery; sensing the quiescent terminal voltage of one or more cells of the battery; and reducing the rate of the charging current in response to the attainment of a predetermined sensed quiescent terminal voltage.

12. A method of charging batteries having one or more cells comprising the steps of applying a charging current to the battery whereby the parameters of terminal voltage, temperature, and pressure of the battery change; sensing the change in one of the parameters; intermittently, in response to the attainment of a preselected value of the sensed parameter, depolarizing the battery by reversing the current through the battery; sensing the quiescent terminal voltage of one or more cells of the battery; and terminating the application of charging current in response to the attainment of a predetermined sensed quiescent terminal voltage.

13. A method of charging batteries having one or more cells comprising the steps of applying a charging current to the battery in excess of the nominal 1-hour rate of the cells of the battery whereby the parameters of terminal voltage, pressure, and temperature of the battery change; sensing the change in one of the parameters; intermittently, in response to the attainment of a preselected value of the sensed parameter, depolarizing the battery by reversing the current through the battery; sensing the quiescent terminal voltage of one or more cells of the battery; and reducing the rate of the charging current below the nominal one hour rate of the cells of the battery in response to the attainment of a predetermined quiescent terminal voltage.

14. A method of charging batteries having one or more cells comprising the steps of applying a charging current to the battery in excess of the nominal 1-hour rate of the cells of the battery whereby the parameters of terminal voltage, pressure, and temperature of the battery change; sensing the change in one of the parameters; intermittently, in response to the attainment of a preselected value of the sensed parameter, depolarizing the battery by reversing the current through the battery; sensing the quiescent terminal voltage of one or more cells of the battery; and terminating the application of charging current in response to the attainment of a predetermined sensed quiescent terminal voltage.